3,043,808
LINEAR POLYESTERS OF DIMETHYLMALONIC ACID AND NEOPENTYL GLYCOL

Hugh J. Hagemeyer, Jr., Longview, Tex., assignor to Eastman Kodak Company, Rochester, N.Y., a corporation of New Jersey
No Drawing. Filed May 20, 1959, Ser. No. 814,385
8 Claims. (Cl. 260—75)

This invention relates to a process for preparing a highly polymeric fiber-forming linear polyester having a melting point greater than 200° C. comprising (A) forming a substantially monomeric condensation product by heating one mole proportion of dimethylmalonic acid with at least one mole proportion of 2,2-dimethyl-1,3-propanediol until about one mole proportion of water is distilled off, (B) heating said monomeric condensation product in a melt-phase under an inert atmosphere until a prepolymer is formed having an intrinsic viscosity measured in a solution of phenol and tetrachloroethane of from about 0.15 to about 0.5, (C) cooling the prepolymer to a solid form, (D) granulating the prepolymer, (E) heating in a solid-phase the granulated prepolymer at from about 150° C. up to the sticking temperature of the prepolymer granules in an inert atmosphere until a polymer is obtained having an intrinsic viscosity of at least 0.4 and a melting point greater than 200° C.

This invention also relates to the polyester produced by this process.

This application is a continuation-in-part of Caldwell and Hagemeyer application Ser. No. 572,633, filed March 20, 1956, now the sole application of Caldwell.

Polyesters prepared from dibasic organic acids and glycols have been frequently described in the prior art. For example, polyethylene terephthalate is now commercially available. The use of certain branched chain aliphatic acids and particular branched chain glycols has been mentioned in several instances as suitable for the production of polyesters. However, most of the branched chain glycols cannot ordinarily be used in any substantial proportion to prepare polyesters having melting points above 200° C. Moreover, the branched chain aliphatic acids are generally not suitable for the preparation of linear polyesters having high softening temperatures.

The prior art teaches that high melting linear polyesters can frequently be prepared from particular aromatic dibasic acids such as terephthalic acid or 4,4'-diphenic acid. Although there have been descriptions of various polyesters derived from aliphatic acids, the utility of such polyesters has been quite limited because of their low melting point. This is ordinarily even more true for branched chain aliphatic dibasic acids such as 2,3-diethyl succinic acid, etc. It is therefore quite surprising that dimethylmalonic acid can be employed according to this invention to produce high melting polyesters. In fact, malonic acid is generally worthless for the production of linear polyesters since it tends to decarboxylate and enter into side reactions. Moreover, dimethylmalonic acid is also capable of decarboxylation and has a tendency under polyesterification conditions to form macrocyclic esters having 16 or more carbon atoms in the ring.

There is a pronounced need for a variety of high melting polyesters derived from dibasic acids and glycols since no single polyester composition possesses a combination of every desirable property. The linear polyesters of this invention are particularly excellent in certain regards as is explained in detail herein.

Polyesters of dimethylmalonic acid can be prepared which have high melting points above 200° C., an intrinsic viscosity of at least 0.4 (generally considerably higher) and the ability to form fibers and films having numerous superior properties (such as high heat distortion temperature) without necessity for cold-drawing. In some instances it is advantageous to subject the fibers or films which can be produced from the polyesters of this invention to a cold-drawing operation so as to obtain even more advantageous properties even though the films and fibers are heat stable without drafting or heat setting. Quite surprisingly, polyesters of dimethylmalonic acid condensed with neopentyl glycol can be successfully produced, even though the tendency to form macrocylic esters with other aliphatic diols is especially pronounced. Moreover, other 1,3-glycols containing the neopentyl carbon structure can be employed to produce valuable polyesters.

When the dimethylmalonic acid and neopentyl glycol polyesters of this invention are made with reactants of high purity or when reasonable purity is maintained and a stabilizer such as triphenyl phosphite is employed, the linear polyesters produced have especially high resistance to ultraviolet light and to hydrolysis. These polymers are noted in particular for their higher resistance to oxidation and their higher melting temperatures as contrasted to polymers derived primarily from hydroxypivalic acid.

An object of this invention is to provide for the first time a satisfactory process for preparing a polyester of dimethylmalonic acid and neopentyl glycol having a melting point of at least 200° C. and an intrinsic viscosity of at least 0.4.

Another object is to provide such a polyester and films, fibers and other objects made thereof.

A further object of this invention is the provision of linear polyester films which have excellent resistance to heat distortion and other advantageous physical properties which make them especially advantageous as a supporting film base for photographic silver halide emulsions of either black and white or color varieties.

An additional object of our invention is to provide a linear polyester which has an unusually high resistance to oxidation, to degradation by ultraviolet light and to decomposition by hydrolysis.

Other objects are apparent elsewhere in this specification.

An embodiment of this invention has been described in the first paragraph of this specification.

The first portion of the process just described (called Stage I) brings about an initial condensation which results in the formation of an ester of the glycol and the acid which includes low polymers (just a few recurring units). The catalytic condensing agent which is already present or which is then added is intended to facilitate the removal of the glycol which is in excess of that required to form the ultimate highly polymeric polyester. This removal is essentially an ester interchange reaction which is conducted at elevated temperatures at a greatly reduced pressure. This can be considered as Stage II of the reaction and can be divided into a preliminary portion where the pressure need not be reduced and a subsequent portion where the pressure is ordinarily greatly reduced. The best products can usually be best obtained by employing as low a pressure as possible during the final portion of the second stage although an exception to this is possible when using the solid-phase technique during the latter portion of Stage II as is described below. The temperature advantageously employed during Stage II is from about 150° C. up to 300° C. Starting temperatures below 150° C. can also be employed followed by elevating the temperature to above 200° C., and preferably to a temperature just about 5–10° C. below the sticking point of the polymer.

The somewhat analogous process using dialkyl esters or the acid dichloride of dimethylmalonic acid is described in Caldwell application Serial No. 572,633, filed on March 20, 1956.

When the process is conducted employing an ester of dimethylmalonic acid instead of the free acid, the catalytic condensing agent can be advantageously added at the beginning of the reaction. In all other regards the reaction is conducted in essentially the same manner as described for the condensation of the pure acid although the catalysts employed are usually selected from a more restricted group which can be referred to as ester-interchange catalysts.

In the preferred processes of this invention the dimethylmalonic acid most preferably has a purity indicated by a melting point of at least 192° C. in order to obtain advantageous polymeric products. The use of neopentyl glycol having a melting point of about 128–129° C. is most advantageously employed. When the purity of any of these materials is of inferior quality the polyesters produced are of lower quality.

Since it is often desirable to conduct the process of this invention in the most advantageous manner to secure the production of highly polymeric products of good color and excellent physical properties, it is especially advantageous to carry out Stage II of the polyesterification according to what has been called the solid-phase technique. During the last portion of Stage II the high vacuum can be dispensed with and the reaction conducted with good circulation of an inert gas to carry off the glycol from the powder.

When employing the solid phase technique, good results are obtained by carrying out the first portion of the second stage of the polymerization in such a way that the polymerization is stopped after a heating period of from about five to ten hours although longer or shorter periods can be employed. This intermediate "prepolymer" advantageously has an intrinsic viscosity of from about 0.15 to about 0.5 in 60% phenol and 40% tetrachlorethane or in any similar solution of phenol and a polychlorethane such as trichlorethane. Ordinarily this prepolymer is satisfactory if it has an intrinsic viscosity of from about 0.15 to about 0.3. The prepolymer is then cooled and the resulting solid product pulverized to a fine granular form having a particle size of from about 0.01 to about 0.03 inch. There is nothing critical about the grain size of the particles and any convenient particle size can be readily employed, e.g. that which passes a 20-mesh sieve. The second portion of Stage II is then begun by reheating the powdered prepolymer to a temperature of from about 150° to 275° C. (preferably 200° to 250° C.) but below the sticking or softening temperature (coagulation point) of the prepolymer. This is usually performed at a pressure of about 1 mm. of mercury pressure until a polymer of the desired physical characteristics is obtained, e.g. the intrinsic viscosity is at least 0.4 (preferably about 0.6 or higher). The solid phase technique can be advantageously conducted at a temperature fairly close to the melting or softening temperature of the powder so as to minimize the length of time required for the polymerization. The solid phase technique facilitates the removal of by-products and hastens formation of the ultimate product desired. The use of the solid phase technique leads to an unexpectedly high degree of polymerization. Instead of a vacuum an inert circulating atmosphere can be employed as has been pointed out above. After melt polymerization during the first portion of Stage II has been conducted for at least 10 hours in the presence of a catalyst and includes heating at a temperature of at least 200° C., the solid phase polymerization in the powder form can be subsequently conducted by beginning the solid phase heating at temperatures up to about 230° C. without exceeding the softening point of the polymer and continuing to increase the temperature taking care that the melting point or softening point is not exceeded. In the absence of any catalyst it is preferable to continue the melt polymerization during the first portion of Stage II by heating for at least 30 hours before carrying out the final portion of Stage II employing the solid phase technique.

An advantageous means for determining when the polymerization has been carried to a satisfactory degree is to test the intrinsic (or inherent) viscosity of the linear polyester being produced. It is generally advantageous to conduct the polymerization until the intrinsic viscosity of the product is at least equal to 0.4 as determined in a mixture of phenol (10 parts by weight) and trichlorphenol (7 parts by weight). There are of course numerous other solvents as well as various proportions which can be used for the measurement of intrinsic viscosity.

The processes described hereinabove can be adapted for continuous operation either with or without the employment of the solid phase technique.

The temperatures mentioned are not to be considered as critical in regard to their limits since higher or lower temperatures can be employed although they will be generally less advantageous. The reaction should be conducted under anhydrous conditions, especially during the latter part thereof and under an inert atmosphere such as nitrogen, hydrogen, argon, etc.

The preferred polyester of this invention melts at a minimum of 240° C. and has an intrinsic viscosity of at least 0.4, preferably melting at about 270–275° C. and having an I.V. of at least 0.6.

The glycolic compound is advantageously employed in excess of that theoretically required (10% to 100% excess, preferably at least 15% excess).

In practicing this invention with incompletely pure reactants it is especially advantageous to include in the polymerization system a stabilizer such as triphenyl phosphite, sodium carbonate, etc. when a gem-dialkyl glycol is being employed. The stabilizers which can be employed in polymerization systems are well known in the art and are described in numerous patents such as those presently classified by the U.S. Patent Office in pertinent subclasses of Class 260. Such stabilizers can be employed in amounts ranging from about 0.05 to about 5% based upon the weight of the materials being condensed. The employment of a stabilizer helps compensate to some extent for the employment of reactants which are not absolutely pure. Moreover, the stabilizers tend to prevent any tendency toward decomposition of the polymer as a result of external conditions which might promote deterioration after they have been formed; for example, heat, sunlight, water, etc. It has been found that triphenyl phosphite is especially advantageous for this purpose although those skilled in the art of preparing synthetic resins will recognize that others can be similarly employed.

The polyesters of this invention can be extruded to form fibers or films. Such techniques are well known. The fibers can be twisted to form yarns which can be woven into fabrics which are quite useful in the manufacture of wearing apparel and for numerous other purposes. The films can be employed for the wrapping of various packaged products and for use as a dielectric in the manufacture of electrical condensers, electric motors, transformers, etc. Coatings of the polyesters of this invention can be extruded onto wire so as to form a superior insulating cover. Films of the polyesters of this invention can be employed as a base for supporting silver halide emulsions adapted for either black and white or color photography. Photographic film supported by the polyester of this invention was especially noteworthy because of the excellent heat stability of these polyesters. The degree of heat distortion in motion picture film and consequent difficulties in movie projectors utilizing high temperature light sources is quite low.

One of the especially remarkable characteristics of the polyesters of this invention is the fact that the fibers and films which can be produced are of excellent physical quality even when they have not been subjected to the customary cold-drawing and heat-setting treatments. In many instances such treatments need not be employed and the products will be completely satisfactory. However, for photographic film and for other more stringent purposes it is advantageous to achieve the highest possible dimensional stability by drafting the polyester after it has been extruded in accordance with the usual cold-drawing techniques followed by heat treatment so as to achieve the optimum crystalline characteristics.

The invention can be further illustrated by the following examples in which the proportions of the ingredients are expressed in parts by weight.

Example 1

A 200-ml. stirred glass vessel was charged with 66 parts of dimethylmalonic acid and 110 parts of 2,2-dimethyl-1,3-propanediol (M.P. 128.5–129° C.). A stream of nitrogen was passed through the vessel with stirring and the reaction vessel was heated for 17 hours to bring it to a temperature of 155° C. and distill out the water formed in the preparation of the diglycol ester of dimethylmalonic acid. To the ester was added 0.03 part of phosphoric acid and 0.03 part of triphenyl phosphite. The contents of the reaction vessel were then heated gradually to 200° C. at 2 mm. pressure to distill out the molar excess of 2,2-dimethyl-1,3-propanediol. Heating was then continued 30 hours at 210° C. and 2 mm. pressure. At the completion of this heating cycle the vessel was cooled and there was obtained 109 grams of a hard, white polymer which softened at 206° and melted at 234° C.

A portion of this solid (29.1 parts) was then heated at 240° for 30 hours at 0.1 mm. pressure to yield 19.4 parts of a hard, white polyester of neopentylene glycol and dimethylmalonic acid which melted at 246–248° C. and had an intrinsic viscosity of 0.46 as determined in a mixture of phenol and trichlorophenol at 25° C. This linear polyester was melt spun into fibers.

A second portion (75.6 parts) of the initial polymer obtained above (M.P. 234° C.) was ground fine enough to pass through a standard 40-mesh screen, and the powder was then heated for 40 hours at 200° C. and 0.1 mm. pressure. The temperature was then gradually raised to 270° C. and 69.3 parts of a white powder (M.P. 271–275° C.), having an intrinsic viscosity of 0.89 as determined in the phenol-trichlorophenol (10–7) mixture, was obtained. The product from this polymerization was melt spun into long flexible fibers which could be cold drawn. Another sample of this material was melt extruded to give a strong flexible film.

Example 2

Dimethylmalonic acid (132 parts) and 2,2-dimethyl-1,3-propanediol (104 parts) were placed in the apparatus described in Example 1. The system was purged with nitrogen for ten minutes. Triphenyl phosphite (2.5 parts) and syrupy phosphoric acid (5.0 parts) were added, stirring was started and the system heated slowly to 160±2° C. A slow stream of nitrogen was passed continuously through the system and the above temperature was maintained with stirring for 24 hours. During this time water (33 parts) was driven off. The system was then subjected to a vacuum of 0.5 mm. of mercury and the temperature gradually raised to 200±2° C. and this temperature was maintained for 10 hours. At the end of this time the reaction system contained a clear, hard glass-like polymer. This substance was removed and pulverized to pass through a 40-mesh screen. This powder (170 parts) was returned to the system, vacuum reapplied, and the temperature gradually raised to 250±2° C. This temperature and a vacuum of 0.2 mm. of mercury were maintained for 12 hours. The polymer resulting from the above procedure was a white powder melting at 261–268° C. and having an intrinsic viscosity of 0.67. A portion of this substance was melt spun into strong flexible fibers and another portion was extruded as clear thin sheets.

Example 3

The process described in Example 1 was repeated exactly except that the addition of the 0.03 part of triphenyl phosphite was omitted. The products obtained were somewhat inferior to those described in Example 1. The use of less pure reactants produced similar results. A high degree of purity reduces the need of a stabilizer for polyesters containing a gem-dialkyl glycol.

Although the invention has been described in detail with particular reference to certain preferred embodiments thereof, it will be understood that variations and modifications can be effected within the spirit and scope of the invention as described hereinabove and as defined in the appended claims.

I claim:

1. A process for preparing a highly polymeric fiber-forming linear polyester having a melting point of at least 240° C. comprising (A) forming a substantially monomeric condensation product by heating reactants consisting of one mole proportion of dimethylmalonic acid and at least one mole proportion of 2,2-dimethyl-1,3-propanediol in the presence of an acidic condensing agent essentially composed of phosphoric acid until about one mole proportion of water is distilled off, (B) heating said monomeric condensation product in a melt-phase under an inert atmosphere until a prepolymer is formed having an intrinsic viscosity measured in a solution of phenol and tetrachloroethane of from about 0.15 to about 0.5, (C) cooling the prepolymer to a solid form, (D) granulating the prepolymer, (E) heating in a solid-phase the granulated prepolymer at from about 150° C. up to the sticking temperature of the prepolymer granules in an atmosphere until a prepolymer is formed having intrinsic viscosity of at least 0.6 and a melting point of at least 240° C.

2. A process as defined in claim 1 conducted in the presence of a stabilizer for a highly polymeric linear polyester.

3. A polyester made by the process defined by claim 2 melting at about 270–275° C.

4. A film of the polyester defined by claim 3.

5. A fiber of the polyester defined by claim 3.

6. A polyester made by the process defined by claim 1.

7. A film of the polyester defined by claim 6.

8. A fiber of the polyester defined by claim 6.

References Cited in the file of this patent

UNITED STATES PATENTS

| | | |
|---|---|---|
| 2,643,989 | Auspos | June 30, 1953 |
| 2,720,503 | Wellman | Oct. 11, 1955 |
| 2,744,092 | Caldwell | May 1, 1956 |
| 2,828,290 | Caldwell | Mar. 25, 1958 |

FOREIGN PATENTS

| | | |
|---|---|---|
| 588,833 | Great Britain | June 4, 1947 |